US011373011B2

(12) United States Patent
Marek et al.

(10) Patent No.: US 11,373,011 B2
(45) Date of Patent: Jun. 28, 2022

(54) SECURITY MODULE WITH MULTIPLE INDEPENDENT PHYSICAL AND VIRTUAL LANES

(71) Applicant: Rockwell Collins, Inc., Cedar Rapids, IA (US)

(72) Inventors: James A. Marek, Anamosa, IA (US); Sarah A. Miller, Cedar Rapids, IA (US); Adriane R. Van Auken, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 226 days.

(21) Appl. No.: 16/459,347

(22) Filed: Jul. 1, 2019

(65) Prior Publication Data
US 2021/0232715 A1    Jul. 29, 2021

(51) Int. Cl.
*G06F 21/76* (2013.01)
*G06F 9/455* (2018.01)
*G06F 13/16* (2006.01)
*G06F 21/33* (2013.01)
*G06F 21/57* (2013.01)
*G06F 21/80* (2013.01)
(Continued)

(52) U.S. Cl.
CPC .......... *G06F 21/76* (2013.01); *G06F 9/45558* (2013.01); *G06F 13/1668* (2013.01); *G06F 21/33* (2013.01); *G06F 21/57* (2013.01); *G06F 21/80* (2013.01); *G06F 21/85* (2013.01); *H04L 63/0823* (2013.01); *G06F 2009/45583* (2013.01)

(58) Field of Classification Search
CPC .......... G06F 21/85; G06F 21/33; G06F 21/57; G06F 21/80; G06F 21/76; G06F 21/72; G06F 9/45558; G06F 13/1668; G06F 2009/45583; H04L 63/0823
See application file for complete search history.

(56) References Cited

U.S. PATENT DOCUMENTS 9,390,291 B2 * 7/2016 Cox .................. G06F 21/72
2014/0047548 A1   2/2014 Bye et al.
(Continued)

OTHER PUBLICATIONS

M. Albuquerque, A. Ayyagari, M. A. Dorsett, and M. S. Foster, "Global information grid (GIG) edge network interface architecture," in Proc. IEEE MILCOM, Orlando, FL, USA, Oct. 2007, pp. 1-7. (Year: 2007).*
(Continued)

*Primary Examiner* — Jacob D Dascomb
(74) *Attorney, Agent, or Firm* — Suiter Swantz pc llo

(57) ABSTRACT

A security module is disclosed. In embodiments, the security module includes a common host platform configured to co-host a plurality of certified functions via a plurality of interconnected hardware resources. The common host platform may be configured to host a first certified function independently certified via a first certifying authority, and a second certified function independently certified via a second certifying authority. The first certified function may be hosted on a first sub-set of dedicated hardware resources and a first sub-set of shared hardware resources. The second certified function may hosted on a second sub-set of dedicated hardware resources and the first sub-set of shared hardware resources including one or more hardware resources shared with the first certified function.

20 Claims, 7 Drawing Sheets

(51) Int. Cl.
G06F 21/85 (2013.01)
H04L 9/40 (2022.01)

(56) References Cited

U.S. PATENT DOCUMENTS

2015/0365227 A1* 12/2015 Billau .................. H04L 9/0877
                                                          713/194
2017/0019259 A1   1/2017 Gatti et al.
2019/0173734 A1*  6/2019 Nachimuthu ....... H04L 41/0896

OTHER PUBLICATIONS

Extended Search Report for European Application No. 20181626.1 dated Nov. 16, 2020, 6 pages.

* cited by examiner

SECURITY MODULE WITH MULTIPLE INDEPENDENT PHYSICAL AND VIRTUAL LANES

BACKGROUND

Traditional module certifications do not support a common host platform which is capable of allocating shared and unshared resources between two or more independent functions certified by separate, independent certifying authorities. For example, a single module may be unable to implement both shared module resources and dedicated module resources between a National Security Agency (NSA) Type 1 certified cryptographic function and a National Cross Domain Strategy Management Office (NCDSMO) certified cross domain function. For instance, using traditional methodology, a common host platform may be configured to host a certified NSA Type 1 cryptographic function, with all the host resources dedicated to that function. Subsequently, the common host platform may be configured to host a NCDSMO certified CDS function on the common hardware. However, the module may only be configured to implement these functions separately, and may not be capable of sharing and/or dedicating a subset of the resources (e.g., I/O) between the independent functions.

SUMMARY

A security module is disclosed. In embodiments, the security module includes a common host platform configured to co-host a plurality of certified functions via a plurality of interconnected hardware resources. The common host platform may be configured to: host a first certified function independently certified via a first certifying authority. The first certified function may be hosted on a first set of hardware resources of the plurality of interconnected hardware resources, the first set of hardware resources including a first sub-set of dedicated hardware resources and a first sub-set of shared hardware resources. The common host platform may be further configured to host a second certified function independently certified via a second certifying authority different from the first certifying authority. The second certified function may hosted on a second set of hardware resources of the plurality of interconnected hardware resources, the second set of hardware resources including a second sub-set of dedicated hardware resources and the first sub-set of shared hardware resources, the first sub-set of shared hardware resources including one or more hardware resources shared with the first certified function.

A security module is disclosed. In embodiments, the security module includes a common host platform configured to co-host a plurality of certified functions. The common host platform may include a first set of one or more dedicated hardware resources, a second set of one or more dedicated hardware resources different from the first set of one or more hardware resources, and a first set of one or more shared hardware resources different from the first set of one or more hardware resources and the second set of one or more hardware resources. In embodiments, the common host platform is configured to host a first certified function independently certified via a first certifying authority, the first certified function hosted on a first set of dedicated hardware resources and the first set of shared hardware resources. In embodiments, the common host platform is further configured to host a second certified function independently certified via a second certifying authority different from the first certifying authority, the second certified function hosted on the second set of one or more dedicated hardware resources and the first set of one or more shared hardware resources.

A method of co-hosting a plurality of certified functions on a common host platform is disclosed. In embodiments, the method may include: receiving a first initial certification of a plurality of interconnected hardware resources of the common host platform from a first certifying authority for a first certified function; receiving a second initial certification of the plurality of interconnected hardware resources of the common host platform from a second certifying authority for a second certified function; assigning a first sub-set of one or more dedicated hardware resources of the plurality of interconnected hardware resources to the first certified function; assigning a second sub-set of one or more dedicated hardware resources of the plurality of interconnected hardware resources to the second certified function; assigning a first sub-set of one or more shared hardware resources to the first certified function and the second certified function; receiving a first function-specific certification of the first set of one or more dedicated hardware resources and the first set of one or more shared hardware resources from the first certifying authority; and receiving a second function-specific certification of the second set of one or more dedicated hardware resources and the first set of one or more shared hardware resources from the second certifying authority.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
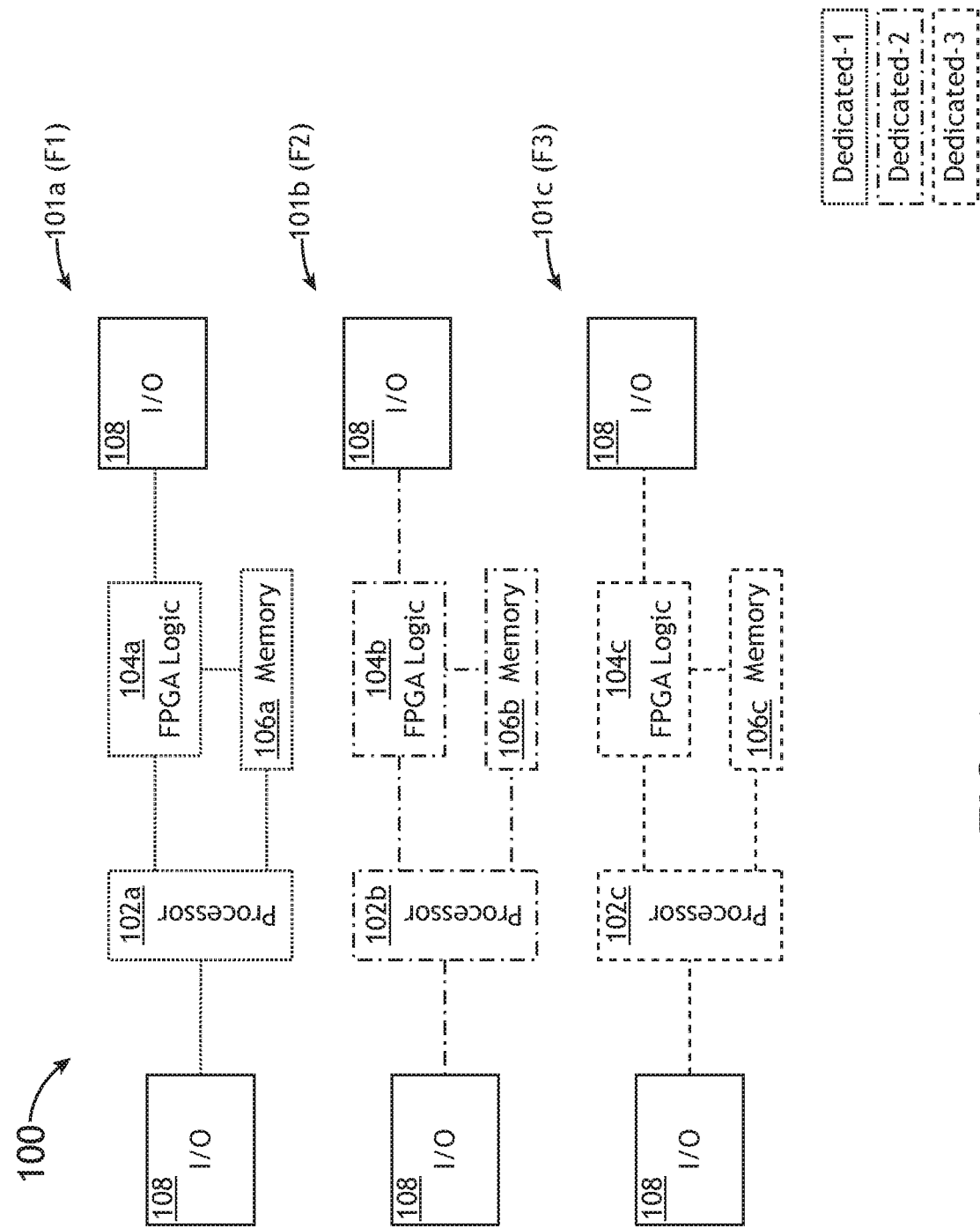
FIG. 1 illustrates a module including fully-dedicated resources for three separate functions certified by three separate certifying authorities.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

As noted previously herein, traditional module certifications do not support a common host platform which is capable of allocating shared and unshared resources between two or more independent functions certified by separate, independent certifying authorities. Conversely, traditional module certifications using shared resources may not be able to host two or more certified functions certified by independent certifying authorities with varying certification requirements.

Accordingly, embodiments of the present disclosure are directed to a system and method for curing one or more of the shortfalls of the previous approaches identified above.

Embodiments of the present disclosure are directed to a common host platform configured to co-host a plurality of certified functions. Additional embodiments of the present disclosure are directed to a common host platform which allocates both shared and dedicated hardware resources in order to co-host a plurality of certified functions certified by a plurality of independent certifying authorities. It is contemplated herein that the use of both shared and dedicated hardware may reduce the size, cost, and weight of associated modules, while simultaneously streamlining the certification process by independent certifying authorities. Further embodiments of the present disclosure are directed to a method of co-hosting a plurality of independent certified functions using both shared and dedicated hardware resources of a common host platform.

Reference will now be made in detail to the subject matter disclosed, which is illustrated in the accompanying drawings.

FIG. 1 illustrates a module 100 including fully-dedicated resources for three separate functions certified by three separate certifying authorities. In particular, module 100 includes fully dedicated (e.g., unshared) hardware resources configured to carry out a first certified function 101a (F1) certified by a first certifying authority (Cert 1), a second certified function 101b (F2) certified by a second certifying authority (Cert 2), and a third certified function 101c (F3) certified by a third certifying authority (Cert 3). For example, as shown in FIG. 1, the first certified function 101a may include dedicated hardware resources including a processor 102a, a field-programmable gate array (FPGA) 104a, and a memory 106a, and one or more input/output (I/O) Additionally, the first certified function 101a may include one or more dedicated (e.g., unshared) input/output (I/O) mechanisms (e.g., I/O device, I/O coupling, and the like) (generally referred to as "I/O 108"). For instance, the first certified function 101a may include a first dedicated I/O 108 communicatively coupled to the processor 102a, and a second dedicated I/O 108 communicatively coupled to the FPGA 104a.

As noted previously herein, traditional modules and circuit cards typically utilize physical separation of hardware resources in order to carry out various processing functions, cryptographic encryption/decryption functions, certified cross-domain functions, and the like. This physical separation is shown in FIG. 1 as dedicated hardware resources physically separated from each other. The module 100 depicted in FIG. 1 may be said to be physically separated from end to end. Dedicated hardware resources dedicated to carrying out particular functions (e.g., F1, F2, F3) illustrates the concept of "physical lanes." As is it used herein, the term "dedicated hardware resource," and like terms, may be used to refer to hardware resources (e.g., processors, FPGA, memory, I/O) which are not shared and which are configured to perform functions for a single certified function 101 (e.g., certified function 101a (F1), certified function 101b (F2), certified function 101c (F3)).

While physical separation of hardware resources may enable co-hosting of functions on a single module/circuit card, it also increases size, weight, power, and cost of the respective modules. Additionally, in many cases, physical separation creates redundancy and underutilization of resources. Therefore, there is a need in the art for a module which allows for increased functionality and more efficient use of hardware resource, while simultaneously decreasing the size, weight, and cost of the module itself.

Figure 2:
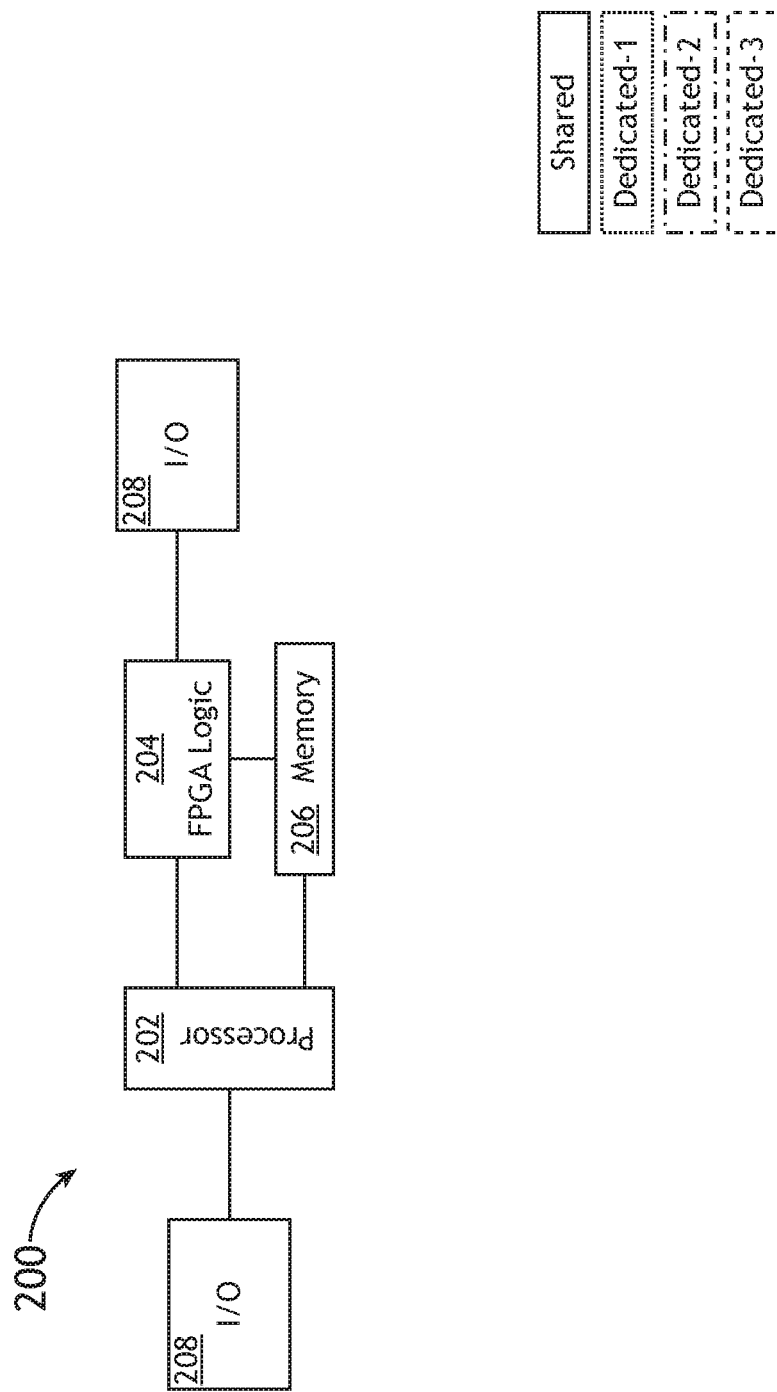
FIG. 2 illustrates a module including fully-shared resources.

FIG. 2 illustrates a module 200 including fully-shared resources. As compared to FIG. 1, FIG. 2 illustrates a module 200 which utilizes shared hardware resources which may be shared by a plurality of certified functions. For example, the processor 202, FPGA 204, memory 206, and I/Os 208 may be designated as shared hardware resources which may be configured to carry out steps/functions for two or more certified functions. As is it used herein, the term "shared hardware resource," and like terms, may be used to refer to hardware resources which are configured to perform functions for a two or more certified functions 101 (e.g., certified function 101a (F1), certified function 101b (F2), certified function 101c (F3)).

The shared hardware resources (e.g., processor 202, FPGA 204, memory 206, I/O 208) illustrated in FIG. 2 illustrates the concept of "virtual lanes," which may be distinguished from the physical separation present in the "physical lanes" depicted in FIG. 1. While the concept of shared hardware resources for carrying out a plurality of functions may be used to decrease the underutilization of resources, it suffers from an inability to allow for certified functions with varying certification requirements which are certified by independent certification authorities. For example, module 200 depicted in FIG. 2 may be unable to be shared by a National Security Agency (NSA) Type 1 certified cryptographic function and a National Cross Domain Strategy Management Office (NCDSMO) certified cross domain function due to the varying certification requirements between the certified functions.

Accordingly, embodiments of the present disclosure are directed to a module which utilizes both physical and virtual separation (e.g., physical lanes and virtual lanes) in order to co-host a plurality of certified functions on a single module. In particular, embodiments of the present disclosure are directed to a common host platform which allocates both shared and unshared (e.g., dedicated) hardware resources to a two or more independently certified functions. It is contemplated herein that embodiments of the present disclosure may allow for independent certification of a plurality of independent certified functions, while avoiding the need for each certifying authority to certify each hardware resource of the common host platform and/or the software/firmware of each function hosted on the common host platform.

Figure 3A:
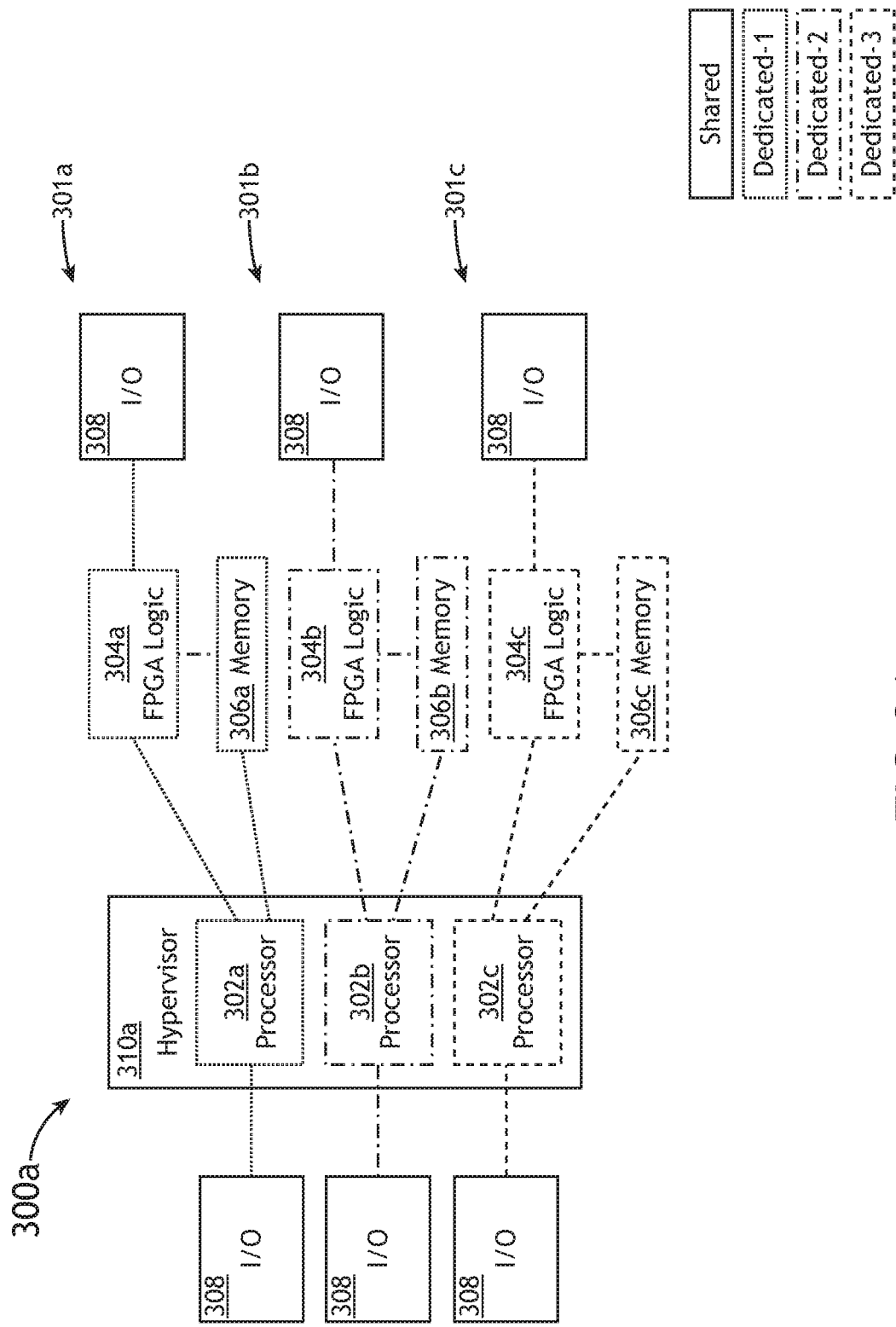
FIG. 3A illustrates a simplified block diagram of a module including shared and dedicated resources, in accordance with one or more embodiments of the present disclosure.

FIG. 3A illustrates a simplified block diagram of a module 300a including shared and dedicated resources, in accordance with one or more embodiments of the present disclosure. The module 300a may include a common host platform including a plurality of interconnected hardware resources including, but not limited to, one or more virtually-separated processors 302a, 302b, 302c, a shared hypervisor 303, one or more dedicated FPGAs 304a, 304b, 304c, one or more dedicated memories 306a, 306b, 306c, and one or more dedicated I/Os 308. As noted previously herein, the one or more I/Os 308 may include any means of input/output known in the art including, but not limited to, I/O devices, I/O couplings, and the like.

In embodiments, the module 300a may be configured to co-host a plurality of certified functions 301 using both shared and dedicated hardware resources of a plurality of interconnected hardware resources. For example, module 300a may be configured to host a first certified function 301a certified by a first certifying authority, a second certified function 301b certified by a second certifying authority, and a third certified function 301c certified by a third certifying authority. For instance, module 300a may be configured to host the first certified function 301a on a processor 302a, an FPGA 304a coupled to the processor 302a, and a memory 306a coupled to the processor 302a and/or FPGA 304a. Continuing with the same example, the first certified function 301a may include a first I/O 308 communicatively coupled to the processor 302a and a second I/O 308 communicatively coupled to the FPGA 304a. By way of another example, module 300 may be configured to host the second certified function 301b on a processor 302b, an FPGA 304b coupled to the processor 302b, and a memory 306b coupled to the processor 302b and/or the FPGA 304b. The second certified function 301b may further include a first I/O 308 communicatively coupled to the processor 302b and a second I/O 308 communicatively coupled to the FPGA 304b.

The various certifying authorities reference herein may include any certifying authority, individual, or entity known in the art including, but not limited to, the National Security Agency (NSA), the National Cross Domain Strategy Management Office (NCDSMO), the National Institute of Standards and Technology (NIST), National Information Assurance Partnership (NIAP), the GPS Directorate (GPS-D), SPO, Nuke Surety, the North Atlantic Treaty Organization, Department of Defense (DoD), the Anti-Tam per Executive Agent (ATEA), Anti-Tamper Evaluation Team (ATET), and the like.

In embodiments, the processors 302a, 302b, 302c are virtually separated (as opposed to physically separated) via a hypervisor 310a. By virtually separating the processors 302a, 302b, 302c, the hypervisor 310a may allow for allocation of processing resources of the hypervisor 310a between the various certified functions 301 co-hosted on the common host platform of the module 300a. In this regard, a single co-hosted certified function 301 may be hosted on the module 300 on a set of hardware resources, wherein the set of hardware resources includes a sub-set of dedicated hardware resources and a sub-set of shared hardware resources. For example, certified function 301 may be hosted on a set of hardware resources including hypervisor 310a (e.g., processor 302a), FPGA 304a, memory 306a, and one or more I/Os 308 wherein the set of hardware resources includes a sub-set of dedicated hardware resources (e.g., FPGA 304a, memory 306a, I/Os 308), and a sub-set of shared hardware resources (e.g., hypervisor 310a).

As noted previously herein, embodiments of the present disclosure are directed to a module 300a which implements both physical separation and virtual separation in order to co-host multiple certified functions 301 on a single common host platform. For example, as compared to the module 100 depicted in FIG. 1 which exhibits physical separation from end to end, module 300a depicted in FIG. 3A exhibits a hybrid of physical and virtual lanes for both physical and virtual separation. For instance, module 300a may exhibit physical separation between the FPGAs 304a, 304b, 304c and the memory 306a, 306b, 306c of the certified functions 301a, 301b, 301c, and may further exhibit virtual separation between the respective processors 302a, 302b, 302c of the co-hosted certified functions 301a, 301b, 301c via a shared hypervisor 310a.

By allocating both shared and unshared (e.g., dedicated) hardware resources to co-hosted certified functions 301, module 300a may enable independent certification of each respective certified function 301 hosted on module 300a. It is contemplated herein that the independent certification of certified functions 301a provided by embodiments of the present disclosure may allow for rapid certification and re-certification of hosted functions. In particular, it is contemplated herein that the improved certification/re-certification provided by module 300a is important in the development and deployment of modular open architectures. Furthermore, embodiments of the present disclosure may provide for the development of standards for sharing resources for cryptographic and cross-domain functions, as well as future functions.

It is contemplated herein that embodiments of the present disclosure may allow for rapid deployment of certified functions, while taking advantage of Moore's Law and increasing levels of processor, network, I/O, and logic resources in complex commercial chips. Embodiments of the present disclosure are based, at least in part, on the use of high-assurance multiple independent levels of security (MILS) concepts and virtualization technologies, which have been met with increasing levels of acceptance and implementation support in commercial off-the-shelf (COTS) chips.

It is noted herein that the examples shown and described herein are exemplary, and that the form, configuration, and/or components of the module 300a may vary without departing from the spirit and scope of the present disclosure. For example, module 300a is shown and described throughout the present disclosure as a single-chip module utilizing a multi-processor system-on-chip (MPSOC) including processors 302, I/O 308, FPGAs 304, and memory 306. However, it is contemplated herein that module 300a may be formed with any number of chips, cards, boards, and the like. In this regard, module 300a is not limited to single-chip solutions, in that multi-chip solutions may be implemented without departing from the spirit and scope of the present disclosure. For example, in some embodiments, module 300a may be implemented in chips which include integrated processors and FPGA fabric which are not MPSOCs.

It is further contemplated herein that additional and/or alternative components may be implemented within module 300a without departing from the spirit and scope of the present disclosure. For example, it is contemplated herein that any application-specific processing device may be implemented in addition to, or in lieu of, FPGAs 304a-304n. In this regard, the module 300a may include one or more application-specific processing devices known in the art including, but not limited to, FPGAs 304, application-specific integrated circuits (ASIC), and the like. By way of another example, in some embodiments, module 300a may be implemented by a multi-processor system-on-chip (MPSOC) which includes embedded processors, multi-core processors, memory devices, I/O, networking hard cores, and FPGAs.

Similarly, it is contemplated herein that a wide variety of components and/or techniques may be used to implement the virtual and physical separation of the present disclosure. Components/techniques which may be implemented by module 300a may include, but are not limited to, hypervisors, virtual LAN, partial re-configuration, partitioned FPGAs, security monitoring (SECMON), formal methods, labeling, cryptographic binding, AT, multi-core processors, cryptography, and the like.

In embodiments, module 300a may allow for certifying authorities to evaluate the interconnected hardware resources of the common host platform of module 300a, as well as the designated physical and virtual separation mechanisms implemented by module 300a. In this regard, module 300a may allow for independent certifying authorities to evaluate the module 300a in such a manner as to ensure a certified function 301a hosted on one set of hardware resources does not impact another certified function 301b hosted on another set of hardware resources in any security-relevant manner. Furthermore, it is contemplated herein that the implementation of both physical and virtual separation within module 300a may allow certifying authorities to independently evaluate respective certified functions 301 and hardware components without requiring each certifying authority to evaluate every hardware resource of module 300a and/or the software/firmware of every certified function 301 hosted on module 300a.

For example, with traditional modules utilizing shared resources, each certifying authority associated with each respective certified function may be required to independently evaluate the module (e.g., module 200 depicted in FIG. 2) as a whole, independently evaluate each hardware resource of the module, and subsequently evaluate each other certified function with which the associated certified function 301 shares hardware resources. This traditional approach requires excessive amounts of evaluation/certification from each respective certifying authority, which can be exceedingly difficult and time-intensive. Additionally, satisfying all interested certifying authorities becomes exponentially more difficult with increasing numbers certified functions co-hosted on individual modules. These drawbacks make traditional modules incompatible with modular, open-architecture platforms.

Conversely, module 300a of the present disclosure may provide for a more streamlined, efficient certification processes. For example, referring to module 300a, certified authorities associated with co-hosted certified functions 301a-301n may evaluate/certify the common host platform of the module 300a (e.g., interconnected hardware resources) as a whole without any function-specific software or firmware loaded on the module 300a. Each certifying authority may then issue an "initial" or "general" certification (hereinafter referred to as an initial certification). Sets of dedicated and shared hardware resources may be assigned to each certified function 301a-301n. Subsequently, each certifying authority may evaluate each respective certified function 301 and the set of hardware resources allocated to the respective function. For example, a first certifying authority may evaluate the first certified function 301a and the set of shared and dedicated hardware resources allocated to the first certified function 301a. After evaluating each respective function individually, each certifying authority may issue a function-specific certification.

By comparing the examples above, it may be seen that embodiments of the present disclosure may eliminate the need for each certifying authority to evaluate every single certified function 301 hosted on the module 300a, thereby streamlining the certification process. Importantly, embodiments of the present disclosure may provide for independent certification by all interested certifying authorities. Additionally, common, shared hardware resources may be implemented in such a manner which is trusted and independently evaluated by all certifying authorities, further simplifying the certification process. Furthermore, limitations and/or requirements on what types of certified functions 301 may share sub-sets of shared hardware resources may be implemented to further streamline the certification process.

With simplified certification processes, it is contemplated herein that module 300a of the present disclosure may be configured to co-host a plurality of certified functions 301 with both shared and unshared hardware resources. Accordingly, module 300 may be configured to host certified functions across a wide variety of applications including, but not limited to, cryptographic encryption/decryption functions, cross-domain functions, AT functions, navigation functions, communications functions, nuke functions, and the like.

Module 300a of the present disclosure may allow for reduced size, weight, power, and cost (SWaP-C) solutions which implement multiple security functions across a significantly smaller footprint. Techniques and functions of the present disclosure may reduce the lifecycle cost for common host platforms and the security module in the Open Communications Standard (OCS). Furthermore, it is contemplated herein that module 300 may reduce the lifecycle cost for future test, training, and live/virtual/constrictive solutions which require multiple security functions, low SWaP, and low latency.

Figure 3B:
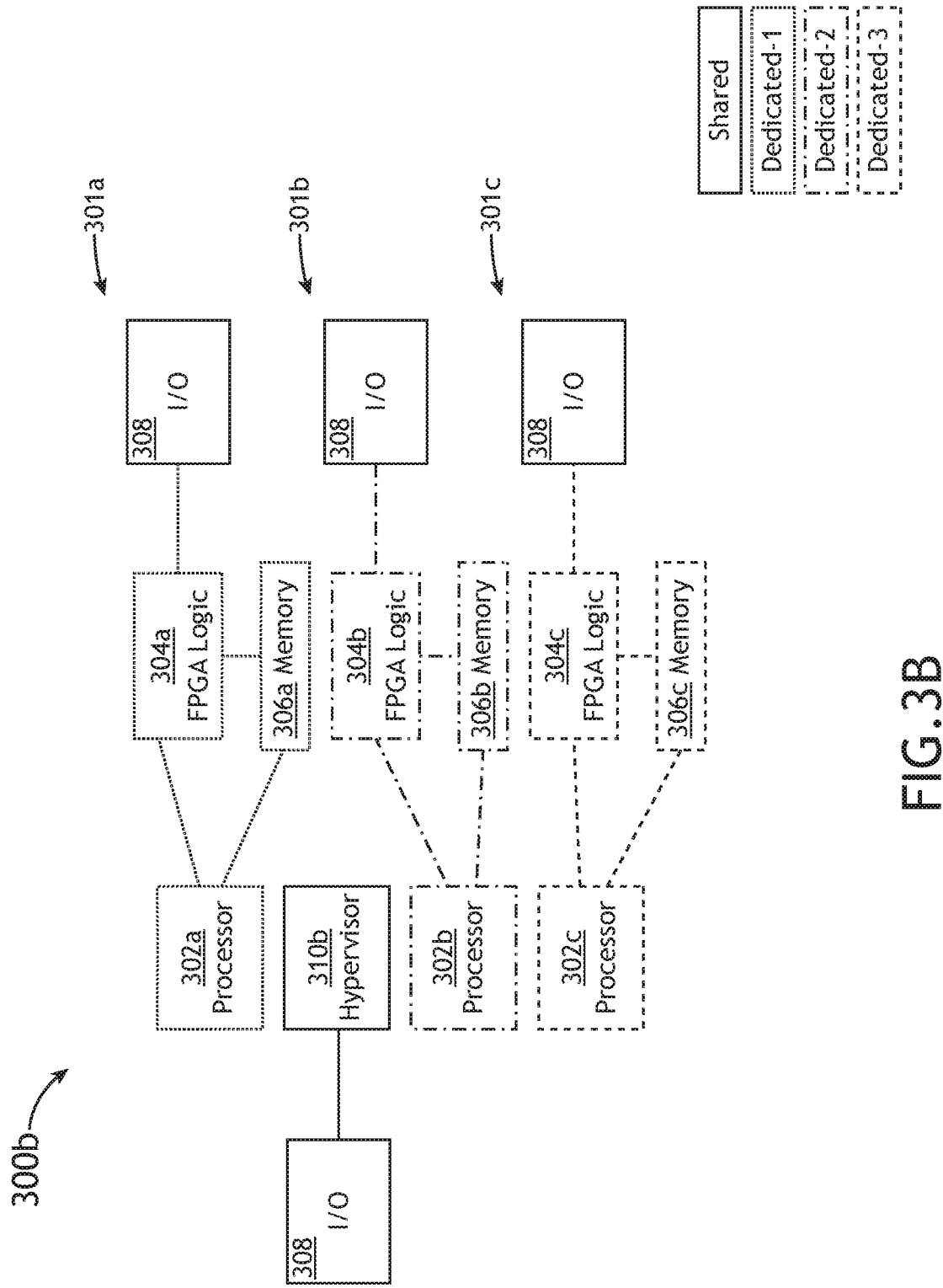
FIG. 3B illustrates a simplified block diagram of a module including shared and dedicated resources, in accordance with one or more embodiments of the present disclosure.

FIG. 3B illustrates a simplified block diagram of a module 300b including shared and dedicated resources, in accordance with one or more embodiments of the present disclosure. The module 300b may include a common host platform including a plurality of interconnected hardware resources including, but not limited to, one or more dedicated processors 302a, 302b, 302c, a shared hypervisor 310b, one or more dedicated FPGAs 304a, 304b, 304c, and one or more dedicated memories 306a, 306b, 306c. The module 300b may further include, but is not limited to, a shared I/O 308 communicatively coupled to the hypervisor 310b and one or more dedicated I/Os 308 communicatively coupled to the one or more FPGAs 304a-304c.

It is noted herein that any discussion associated with module 300a illustrated in FIG. 3A may be regarded as applying to module 300b illustrated in FIG. 3B, unless noted otherwise herein. Generally, module 300b depicted in FIG. 3B illustrates an additional and/or alternative implementation of module 300a exhibiting both physical and virtual separation of hardware resources.

Comparing module 300a depicted in FIG. 3A and module 300b FIG. 3B, it may be seen that module 300b depicted in FIG. 3B exhibits physical separation between the processors 302a, 302b, 302c, whereas module 300a depicted in FIG. 3A exhibits only virtual separation between the processors 302a, 302b, 302c. Furthermore, module 300b depicted in FIG. 3B includes a common, shared hypervisor 310b with a single shared I/O 308 communicatively coupled to the hypervisor 310b.

In embodiments, shared hypervisor 310b may be configured to communicatively couple to each of the dedicated processors 302a, 302b, 302c of each respective certified function 301a, 301b, 301c. In this regard, hypervisor 310b may be configured to share data with each of processor 302a, processor 302b, and processor 302c, whereas each respective processor 302a, processor 302b, and processor 302c can not communicate directly with each other. In this regard, data may not be shared between the respective certified functions 301a, 301b, 301c except through the hypervisor 310b. Accordingly, module 300b of FIG. 3B illustrates an embodiment of the present disclosure which exhibits more physical separation (e.g., less virtual separation, fewer shared resources) as compared to module 300a of FIG. 3A.

Figure 3C:
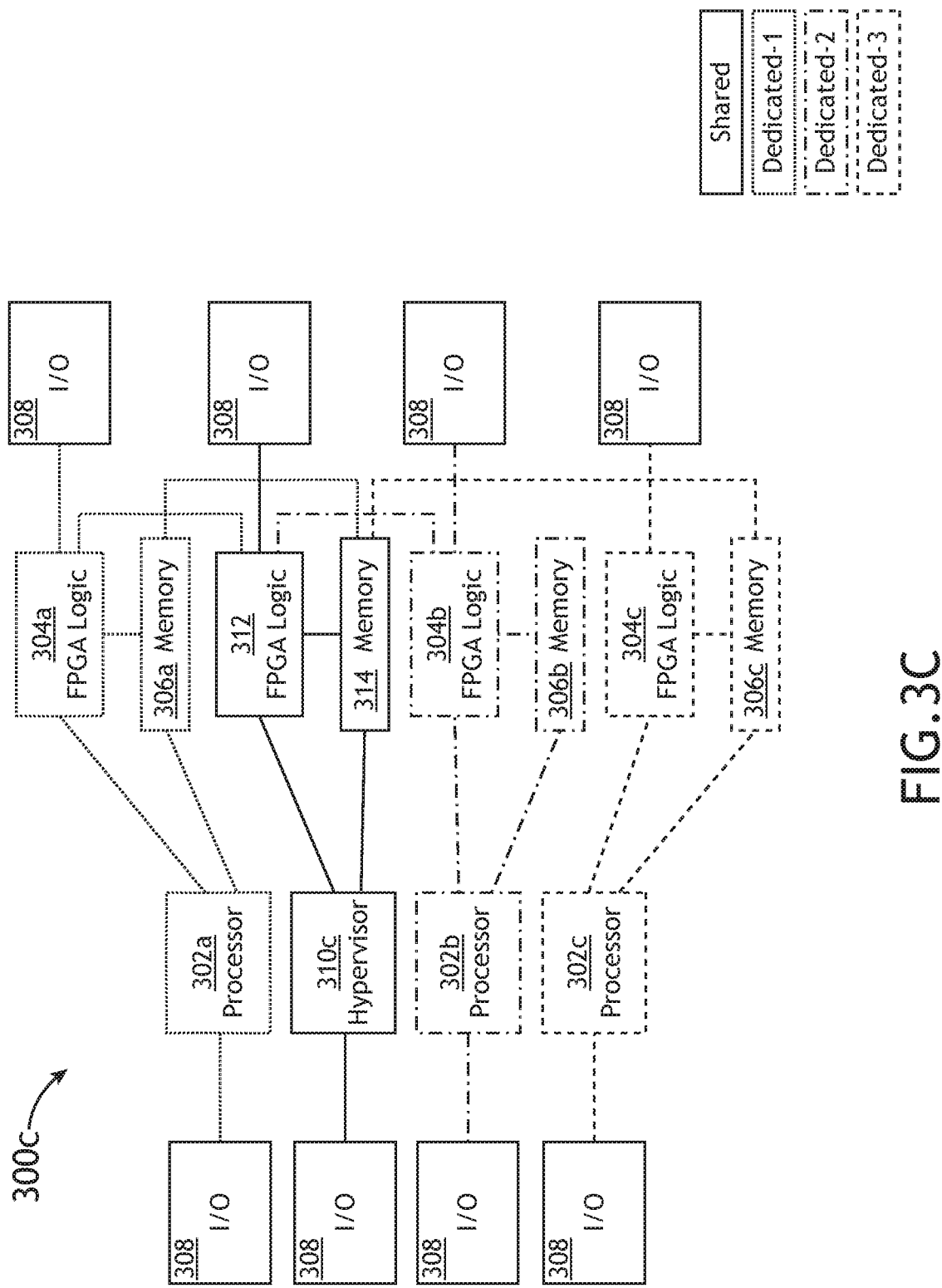
FIG. 3C illustrates a simplified block diagram of a module including shared and dedicated resources, in accordance with one or more embodiments of the present disclosure.

FIG. 3C illustrates a simplified block diagram of a module 300c including shared and dedicated resources, in accordance with one or more embodiments of the present disclosure. The module 300c may include a common host platform including a plurality of interconnected hardware resources including, but not limited to, one or more dedicated processors 302a, 302b, 302c, a shared hypervisor 310c, one or more dedicated FPGAs 304a, 304b, 304c, one or more dedicated memories 306a, 306b, 306c, a shared FPGA 312, and a shared memory 314. Module 300c may further include one or more dedicated I/Os 308 communicatively coupled to the processors 302a-302c and/or the one or more FPGAs 304a-304c, and one or more shared I/Os 308 communicatively coupled to the hypervisor 310c and/or FPGA 312.

It is noted herein that any discussion associated with modules 300a-300b illustrated in FIGS. 3A-3B may be regarded as applying to module 300c illustrated in FIG. 3C, unless noted otherwise herein. Generally, module 300c depicted in FIG. 3C illustrates an additional and/or alternative implementation of modules 300a-300b exhibiting both physical and virtual separation of hardware resources.

In embodiments, as noted with respect to FIG. 3B, module 300c illustrated in FIG. 3C may exhibit physical separation between the dedicated processors 302a, 302b, 302c of each respective certified function 301a, 301b, 301c. Module 300c may also include a shared hypervisor 310c communicatively coupled to processors 302a, 302b, 302c. In embodiments, a shared I/O 308 may be communicatively coupled to the the shared hypervisor 310c, and one or more dedicated I/Os 308 may be communicatively coupled to the dedicated processors 302a, 302b, 302c.

In embodiments, module 300c includes a shared FPGA 312 communicatively coupled to the shared hypervisor 310c. Module 300c may further include a shared memory 314 communicatively coupled to the shared FPGA 312 and/or the shared hypervisor 310c. In embodiments, the shared FPGA 312 may be communicatively coupled to one or more of the dedicated FPGAs 304a, 304b, 304c. For example, as shown in FIG. 3C, the shared FPGA 312 may be communicatively coupled to the first dedicated FPGA 304a and the second dedicated FPGA 304b. In this regard, the first dedicated FPGA 304a and the second dedicated FPGA 304b may be configured to share data directly with the shared FPGA 312. Additionally, the shared FPGA 312 may be configured to determine if and/or which data may be shared between the first dedicated FPGA 304a and the second dedicated FPGA 304b, such that data may be indirectly shared between the first certified function 301a and the second certified function 301b. Accordingly, in some embodiments, the shared FPGA 312 may be configured to determine logically which connections are available between the respective co-hosted certified function 301a-301n, and may determine how data may flow among/between each respective certified function 301a-301n.

In embodiments, the shared memory 314 may be communicatively coupled to one or more of the dedicated memories 306a, 306b, 306c. For example, the shared memory 314 may be communicatively coupled to the first dedicated memory 306a and the third dedicated memory 306c. In this regard, the first dedicated memory 306a and the third dedicated memory 306c may be configured to share data directly with the shared memory 314. Additionally, the shared memory 314 may be configured to determine if and/or which data may be shared between the first dedicated memory 306a and the third dedicated memory 306c, such that data may be indirectly shared between the first certified function 301a and the third certified function 301c.

As noted previously herein, various configurations of modules 300a-300c depicted in FIG. 3A-3C are provided solely for illustration, and are not to be regarded as limiting on the scope of the present disclosure, unless noted otherwise herein. In this regard, additional and/or alternative configurations of modules 300a-300c exhibiting both physical and virtual separation may be implemented without departing from the spirit and scope of the present disclosure.

Figure 4:
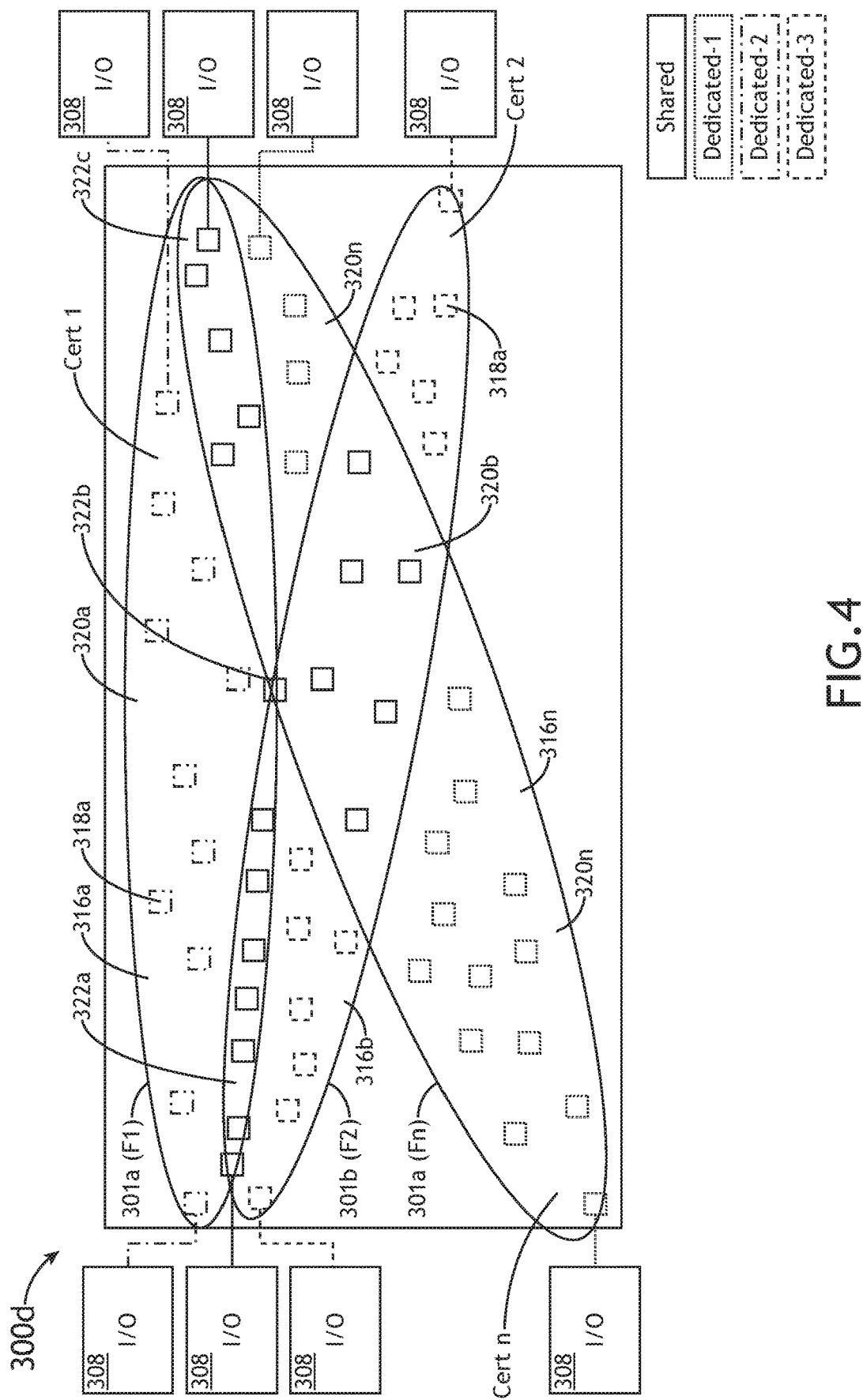
FIG. 4 illustrates a simplified block diagram of a module including shared and dedicated resources, in accordance with one or more embodiments of the present disclosure.

FIG. 4 illustrates a simplified block diagram of a module 300d including shared and dedicated resources, in accordance with one or more embodiments of the present disclosure. In embodiments, module 300d may include a plurality of interconnected hardware resources 318a-318n. As noted previously herein, the plurality of interconnected hardware resources 318a-318n may include any hardware resources known in the art including, but not limited to, processors 302, FPGA 304, memory 306, I/O 308, hypervisor 310, and the like.

It is noted herein that any discussion associated with modules 300a-300c illustrated in FIGS. 3A-3C may be regarded as applying to module 300d illustrated in FIG. 4, unless noted otherwise herein.

As shown in FIG. 4, module 300d may include a plurality of interconnected hardware resources 318a-318n. In embodiments, module 300d may be configured to host a plurality of co-hosted certified functions 301a-301n. In embodiments, each certified function 301a-301n is hosted on a set of hardware resources 316a-316n of the plurality of interconnected hardware resources 318a-318n, wherein each set of hardware resources 316 for each respective certified function 301a-301n includes a sub-set of dedicated hardware resources 320 and one or more sub-sets of shared hardware resources 322. For example, as shown in FIG. 4, the first certified function 301a may be hosted on a set of hardware resources 316a of the plurality of hardware resources 318a-318n, wherein the set of hardware resources 316a includes a sub-set of dedicated hardware resources 320, a first sub-set of shared hardware resources 322a shared with a second certified function 301b, a second sub-set of shared hardware resources 322b shared with the second certified function 301b and the nth certified function 301n, and a third sub-set of shared hardware resources 322c shared with the nth certified function 301n.

Figure 5:
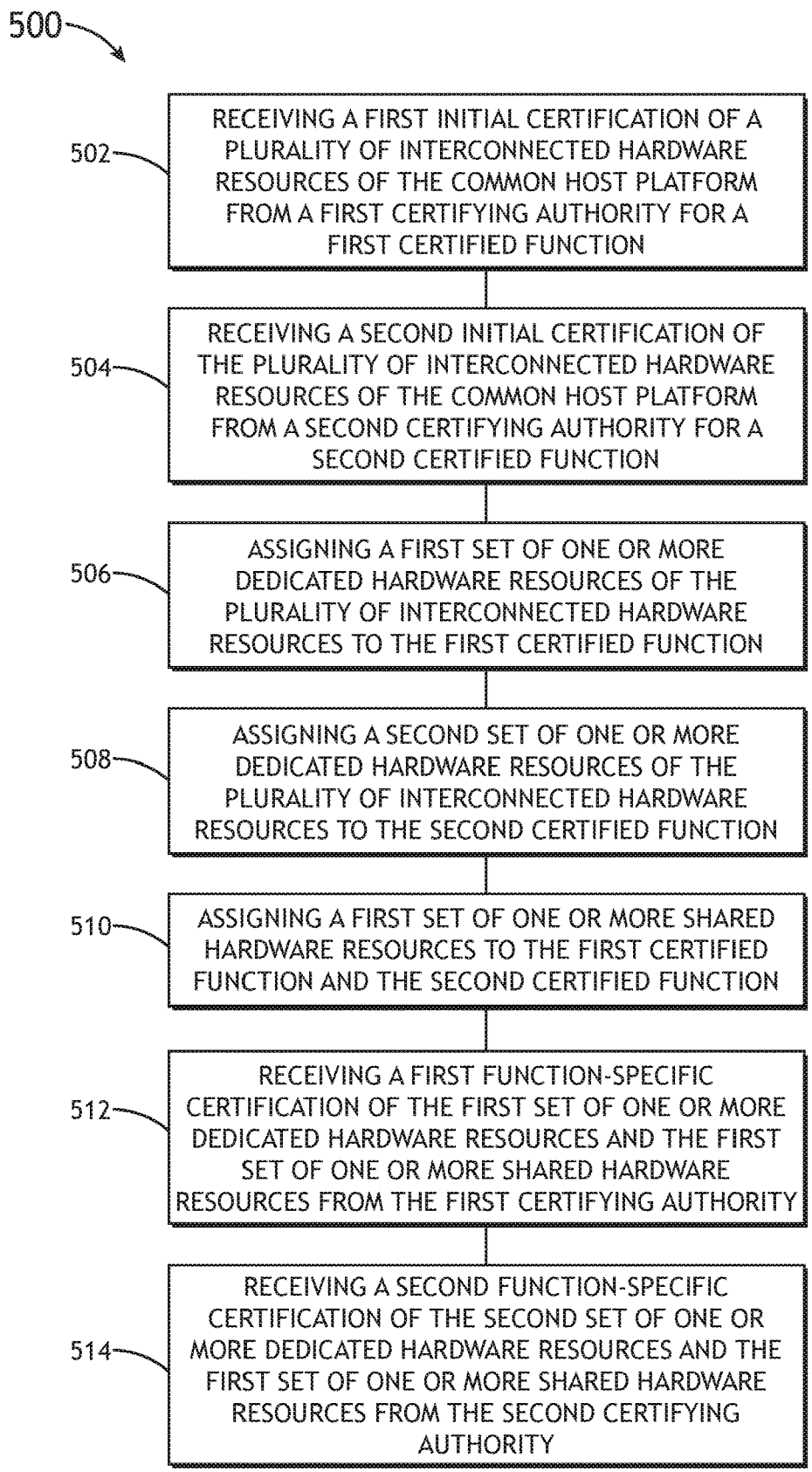
FIG. 5 illustrates a flowchart of a method for co-hosting a plurality of certified functions on a common host platform, in accordance with one or more embodiments of the present disclosure.

FIG. 5 illustrates a flowchart of a method 500 for co-hosting a plurality of certified functions on a common host platform, in accordance with one or more embodiments of the present disclosure. It is noted herein that the steps of method 500 may be implemented all or in part by modules 300a-300c. It is further recognized, however, that the method 500 is not limited to the modules 300a-300c in that additional or alternative system-level embodiments may carry out all or part of the steps of method 500.

In a step 502, a first initial certification of a plurality of interconnected hardware resources of a common host platform is received from a first certifying authority for a first certified function. For example, referring to FIG. 4, a first certifying authority (Cert 1) for a first certified function 301a may evaluate and certify a plurality of interconnected hardware resources 318a-318n of a common host platform of a module 300d. Subsequently, a first initial certification of the common host platform may be received from the first certifying authority (Cert 1).

In a step 504, a second initial certification of the plurality of interconnected hardware resources of the common host platform is received from a second certifying authority for a second certified function. For example, continuing with reference to FIG. 4, a second certifying authority (Cert 2) for a second certified function 301b may evaluate and certify the plurality of interconnected hardware resources 318a-318n of the common host platform of the module 300d. Subsequently, a second initial certification of the common host platform may be received from the second certifying authority (Cert 2). As noted previously herein, the initial certifications of the common host platform may include evaluations/certifications of the common host platform of the module 300 (e.g., interconnected hardware resources) as a whole without any function-specific software or firmware loaded on the module 300d.

In a step 506, a first set of one or more dedicated hardware resources of the plurality of interconnected hardware resources are assigned/allocated to the first certified function. For example, a first set of hardware resources 316 of the plurality of interconnected hardware resources 318a-318n may be assigned/allocated to the first certified function 301a. The first set of hardware resources 316 may include a first sub-set of dedicated hardware resources 320a allocated to the first certified function 301a.

In a step 508, a second set of one or more dedicated hardware resources of the plurality of interconnected hardware resources is assigned to the second certified function. For example, a second sub-set of dedicated hardware resources 320b may be allocated to the second certified function 301b.

In a step 510, a first set of one or more shared hardware resources is assigned to to the first certified function and the second certified function. For example, as shown in FIG. 4, a first sub-set of shared hardware resources 322a may be included within the first set of hardware resources 316a allocated to the first certified function 301 and the second set of hardware resources 316b allocated to the second certified function 301b. In this regard, the first sub-set of shared hardware resources 322a may be assigned/allocated to both the first certified function 301a and the second certified function 301b.

In a step 512, a first function-specific certification of the first set of one or more dedicated hardware resources and the first set of one or more shared hardware resources is received from the first certifying authority. For example, the first certifying authority (Cert 1) may evaluate the first set of hardware resources 316a including the first sub-set of dedicated hardware resources 320a and the first sub-set of shared hardware resources 322a. Subsequently, a first function-specific certification of the common host platform may be received from the first certifying authority (Cert 1). With embodiments including multiple sub-sets of shared hardware resources 322a, 322b, 322c, 322n, it is noted herein that respective certifying authorities may evaluate each respective sub-set of shared hardware resources 322.

In a step 514, a second function-specific certification of the second set of one or more dedicated hardware resources and the first set of one or more shared hardware resources is received from the second certifying authority. For example, the second certifying authority (Cert 2) may evaluate the second set of hardware resources 308b including the second sub-set of dedicated hardware resources 320b and the first sub-set of shared hardware resources 322a. Subsequently, a second function-specific certification of the common host platform may be received from the second certifying authority (Cert 2).

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims.

Furthermore, any dimensions, degrees, and/or numerical ranges provided herein are to be understood as non-limiting examples unless otherwise specified in the claims.

What is claimed:

1. A security module comprising:
a common host platform configured to co-host a plurality of at least two different certified functions at the same time, the common host platform including a plurality of interconnected hardware resources, wherein the common host platform is configured to:
host a first certified function via a first set of hardware resources of the plurality of interconnected hardware resources, the first certified function security certified according to at least one of a first certifying authority or a first set of security certification requirements, the first set of hardware resources including a first sub-set of dedicated hardware resources and a first sub-set of shared hardware resources;
and
host a second certified function independently certified via a second certifying authority different from the first certifying authority, the second certified function hosted on a second set of hardware resources of the plurality of interconnected hardware resources, the second certified function security certified according to at least one of a second certifying authority different from the first certifying authority or a second set of security certification requirements different from the first set of security certification requirements, the second set of hardware resources including a second sub-set of dedicated hardware resources and the first sub-set of shared hardware resources, the first sub-set of shared hardware resources including one or more hardware resources shared with the first certified function.

2. The security module of claim 1, wherein the plurality of interconnected hardware resources comprises:
one or more processors;
one or more memory devices;
and
one or more application-specific processing devices.

3. The security module of claim 2, wherein the one or more application-specific processing devices include at least one of a field programmable gate array (FPGA) or an application-specific integrated circuit (ASIC).

4. The security module of claim 1, wherein at least one of the first certifying authority or the second certifying authority comprises at least one of the National Security Agency (NSA), the National Cross Domain Strategy Management Office (NCDSMO), the National Institute of Standards and Technology (NIST), the GPS Directorate (GPS-D), the National Information Assurance Partnership (NIAP), Nuke Surety, the North Atlantic Treaty Organization, the Department of Defense (DoD), or the Anti-Tamper Executive Agent (ATEA), Anti-Tamper Evaluation Team (ATET).

5. The security module of claim 1, wherein at least one of the first certified function or the second certified function comprises at least one of a cryptographic function or a cross domain solution (CDS) function.

6. The security module of claim 1, wherein the common host platform is further configured to:
host at least one additional certified function independently certified via an additional certifying authority different from the first certifying authority and the second certifying authority, each additional certified function security certified according to at least one of an additional certifying authority or an additional set of security certification requirements, the additional certified function hosted on an additional set of hardware resources of the plurality of interconnected hardware resources, the additional set of hardware resources including an additional sub-set of dedicated hardware resources and a second sub-set of shared hardware resources, wherein the second sub-set of shared hardware resources include one or more hardware resources shared with at least one of the first certified function or the second certified function.

7. The security module of claim 1, wherein
the first sub-set of dedicated hardware resources comprises a first field-programmable gate array (FPGA) and a first memory communicatively coupled to the first FPGA,
the second sub-set of dedicated hardware resources comprises a second field-programmable gate array (FPGA) and a second memory communicatively coupled to the second FPGA,
and
the first sub-set of shared hardware resources comprises a hypervisor including one or more processors, wherein the hypervisor is communicatively coupled to at least one of the first FPGA or the first memory, and communicatively coupled to at least one of the second FPGA or the second memory.

8. The security module of claim 1, wherein
the first sub-set of dedicated hardware resources comprises a first processor communicatively coupled to a first field-programmable gate array (FPGA) and a first memory,
the second sub-set of dedicated hardware resources comprises a second processor communicatively coupled to a second field-programmable gate array (FPGA) and a second memory,
and
the first sub-set of shared hardware resources comprises at least one shared processor communicatively coupled to the first processor and the second processor.

9. The security module of claim 1, wherein
the first sub-set of dedicated hardware resources comprises a first processor communicatively coupled to a first field-programmable gate array (FPGA) and a first memory,
the second sub-set of dedicated hardware resources comprises a second processor communicatively coupled to a second field-programmable gate array (FPGA) and a second memory,
and
the first set of shared hardware resources comprises at least one shared processor communicatively coupled to a shared FPGA and a shared memory,
wherein the shared processor is communicatively coupled to the first processor and the second processor,
wherein the shared FPGA is communicatively coupled to at least one of the first FPGA or the second FPGA,
and
wherein the shared memory is communicatively coupled to the first memory or the second memory.

10. A security module comprising:
a common host platform configured to co-host a plurality of at least two different security certified functions at the same time, the common host platform including:
a first set of one or more dedicated hardware resources;
a second set of one or more dedicated hardware resources different from the first set of one or more dedicated hardware resources;

and
a first set of one or more shared hardware resources different from the first set of one or more dedicated hardware resources and the second set of one or more dedicated hardware resources, wherein the common host platform is configured to host a first certified function via the first set of dedicated hardware resources and the first set of shared hardware resources, the first certified function security certified according to at least one of a first certifying authority or a first set of security certification requirements, and wherein the common host platform is further configured to host a second certified function via the second set of one or more dedicated hardware resources and the first set of one or more shared hardware resources, the second certified function security certified according to at least one of a second certifying authority different from the first certifying authority or a second set of security certification requirements different from the first set of security certification requirements.

11. The security module of claim 10, wherein at least one of the first certifying authority or the second certifying authority comprises at least one of the National Security Agency (NSA) or the National Cross Domain Strategy Management Office (NCDSMO).

12. The security module of claim 10, wherein at least one of the first certified function or the second certified function comprises at least one of a cryptographic function or a cross domain solution (CDS) function.

13. The security module of claim 10, wherein the common host platform is further configured to:
host at least one additional certified function different from the first certifying authority and the second certifying authority, each additional certified function security certified according to at least one of an additional certifying authority and an additional set of security certification requirements,
each additional certified function hosted via an additional set of one or more dedicated hardware resources and an additional set of one or more shared hardware resources, the additional set of shared hardware resources including one or more hardware resources shared with at least one of the first certified function or the second certified function.

14. The security module of claim 10, wherein
the first set of one or more dedicated hardware resources comprises a first field-programmable gate array (FPGA) and a first memory communicatively coupled to the first FPGA,
the second set of dedicated hardware resources comprises a second field-programmable gate array (FPGA) and a second memory communicatively coupled to the second FPGA,
and
the first set of shared hardware resources comprises a hypervisor including one or more processors, wherein the hypervisor is communicatively coupled to at least one of the first FPGA or the first memory, and communicatively coupled to at least one of the second FPGA or the second memory.

15. The security module of claim 10, wherein
the first set of dedicated hardware resources comprises a first processor communicatively coupled to a first field-programmable gate array (FPGA) and a first memory,
the second set of dedicated hardware resources comprises a second processor communicatively coupled to a second field-programmable gate array (FPGA) and a second memory,
and
the first set of shared hardware resources comprises at least one shared processor communicatively coupled to the first processor and the second processor.

16. The security module of claim 10, wherein
the first set of dedicated hardware resources comprises a first processor communicatively coupled to a first field-programmable gate array (FPGA) and a first memory,
the second set of dedicated hardware resources comprises a second processor communicatively coupled to a second field-programmable gate array (FPGA) and a second memory,
and
the first set of shared hardware resources comprises at least one shared processor communicatively coupled to a shared FPGA and a shared memory, wherein the shared processor is communicatively coupled to the first processor and the second processor, wherein the shared FPGA is communicatively coupled to at least one of the first FPGA or the second FPGA, wherein the shared memory is communicatively coupled to the first memory or the second memory.

17. A method of co-hosting a plurality of at least two different certified functions on a common host platform at the same time, comprising:
receiving a first initial certification of a plurality of interconnected hardware resources of the common host platform for a first certified function, the first initial certification associated with at least one of a first certifying authority or a first general set of security certification requirements;
receiving at least one second initial certification of the plurality of interconnected hardware resources of the common host platform for a second certified function, each second initial certification associated with at least one of a second certifying authority or a second general set of security certification requirements;
assigning a first sub-set of one or more dedicated hardware resources of the plurality of interconnected hardware resources to the first certified function;
assigning at least one second sub-set of one or more dedicated hardware resources of the plurality of interconnected hardware resources to each second certified function;
assigning a first sub-set of one or more shared hardware resources to the first certified function and the at least one second certified function;
receiving a first function-specific certification of the first sub-set of one or more dedicated hardware resources and the first sub-set of one or more shared hardware resources from the first certifying authority, the first function-specific certification associated with at least one of the first certified function or a first function-specific set of security certification requirements;
and
receiving at least one second function-specific certification of the at least one second set of one or more dedicated hardware resources and the first set of one or more shared hardware resources from the second certifying authority, each second function-specific certification associated with at least one of the at least one second certified function and a second function-specific set of security certification requirements.

18. The method of claim 17, wherein at least one of the first certified function or the at least one second certified function comprises at least one of a cryptographic function or a cross domain solution (CDS) function.

19. The method of claim 17, wherein
the first sub-set of dedicated hardware resources comprises a first field-programmable gate array (FPGA) and a first memory communicatively coupled to the first FPGA,
each second sub-set of dedicated hardware resources comprises a second field-programmable gate array (FPGA) and a second memory communicatively coupled to the second FPGA,
and
the first sub-set of shared hardware resources comprises a hypervisor including one or more processors, wherein the hypervisor is communicatively coupled to at least one of the first FPGA or the first memory, and communicatively coupled to at least one of the second FPGA or the second memory.

20. The method of claim 17, wherein
the first sub-set of dedicated hardware resources comprises a first processor communicatively coupled to a first field-programmable gate array (FPGA) and a first memory,
each second sub-set of dedicated hardware resources comprises a second processor communicatively coupled to a second field-programmable gate array (FPGA) and a second memory,
and
the first set of shared hardware resources comprises at least one shared processor communicatively coupled to the first processor and the at least one second processor.

* * * * *